June 6, 1961  D. C. MEYERS  2,987,366
DATA-RECORDING SYSTEM
Filed June 24, 1957  3 Sheets-Sheet 1

INVENTOR:
DOUGLAS C. MEYERS
BY: Oswald H. Milmore
HIS ATTORNEY

June 6, 1961

D. C. MEYERS 2,987,366

DATA-RECORDING SYSTEM

Filed June 24, 1957

INVENTOR:
DOUGLAS C. MEYERS
BY Oswald D Milmore
HIS ATTORNEY

June 6, 1961
D. C. MEYERS
2,987,366
DATA-RECORDING SYSTEM
Filed June 24, 1957
3 Sheets-Sheet 3
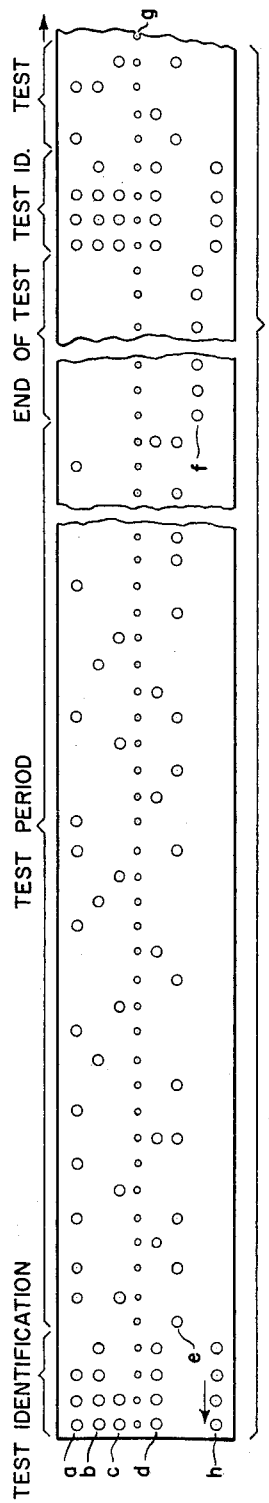
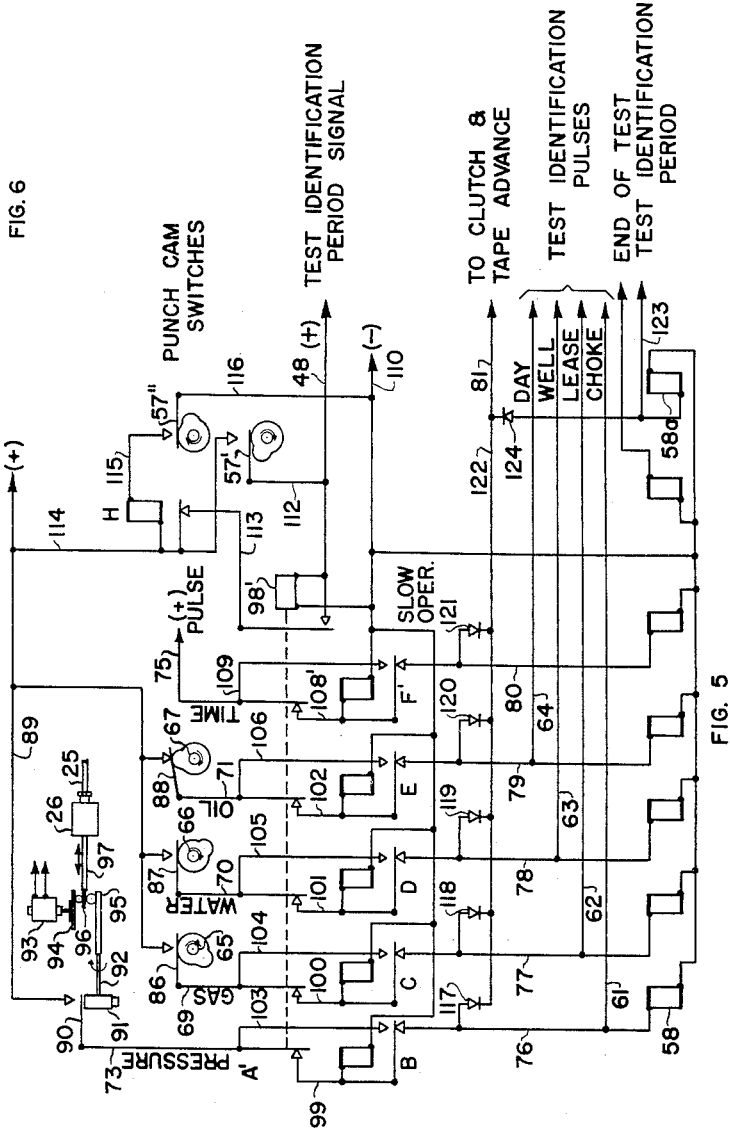
INVENTOR:
DOUGLAS C. MEYERS
BY: Oswald H. Wilmore
HIS ATTORNEY

2,987,366
DATA-RECORDING SYSTEM
Douglas C. Meyers, Metairie, La., assignor to Shell
Oil Company, a corporation of Delaware
Filed June 24, 1957, Ser. No. 667,573
6 Claims. (Cl. 346—50)

The invention relates broadly to the preparation of machine-sensitive records of a plurality of concurrently changing data produced by separate data-producing means, such as monotonic data (which change progressively in one sense), e.g., the passage of time, the measurement of fluid or electrical current flow, or the counting of objects or events, or fluctuating data such as those resulting from the measurements of conditions, e.g., temperature, pressure and the like. Each such item of changing data can be represented as a series of repetitive events, as is explained hereinafter, and the invention is, more particularly, concerned with an improved method and apparatus for preparing records of such events in a form suitable to mechanical translation into electrical movements or mechanical movements having approximately the same time relation to one another as the events denoted thereby.

The invention is particularly applicable to logging systems and will be described as applied to the automatic logging of test data on oil wells; however, the invention is not limited to this specific application.

There is need in many industrial and research activities to provide a record of data in such a form that the events can be later analyzed and which will represent the relation between data changes on a common time basis. Often, as in the case of well testing, tests are run over an extended period of time, such as two to ten hours, and a series of such tests are run consecutively, and it is desirable to prepare a machine-sensitive record which can be interpreted by automatic reading devices in a much shorter time than was consumed in making the test.

Prior systems for making simultaneous records of concurrently varying measurement data have used a continuously moving record medium, such as a drum or a paper tape, in combination with a plurality of laterally spaced pens, each connected to a separate data source to show by deflections the signals emitted by the sources. Such written records are not readily read or interpreted by automatic readers and usually lack durability, being subject to smudging and fading. Further, when the record medium is advanced continuously, they fail to provide flexibility. For example, to avoid the need for excessively long tapes in tests of long duration very slow rates of tape advance are used; such slow rates, however, make the rapid recordation of miscellaneous test-identification information or fixed data, such as the test date, identity of the well or test conditions, impracticable and require the use of extra record channels for such information.

On the other hand, mechanically interpretable data records, such as multi-channel punched tape, have heretofore been prepared by coding the data, if necessary after converting analogue measurements into digital form, and punching each entry as a row of holes which is transverse to the length of the tape and includes holes in a coded pattern. (See U.S. Patent No. 2,701,748.) Although durable and easily read, such tapes are not adapted for direct interpretation without decoding the patterns; hence they cannot be used directly in interpreting equipment which accepts analogue data for reconstructing test conditions.

It is an object of this invention to provide an improved method and apparatus for making a record of concurrently changing data from a plurality of data sources in machine-sensitive form, using a plurality of parallel and separate channels on the record medium which are allocated to separate data sources. "Machine-sensitive record" is used herein to denote any record containing a series of marks of such a character and situated in such spaced relation that the marks can be translated into electrical currents or mechanical movements; such marks are usually alike, as in the case of punched tape, but the invention does not exclude the use of different marks for additionally representing information beyond that considered for the purposes of the present invention. Ancillary thereto it is an object to provide a machine-sensitive record of a plurality of contemporaneously occurring, additive changes which can be employed to actuate a variety of interpreting devices, such as analyzers which determine the ratio of various magnitudes during different portions of the test period, automatic plotting devices, or counters which add the marks in the several channels and read out or display the totals.

Another object is to provide a machine-sensitive record wherein data of measured magnitudes and time marks are recorded orthochronistically in separate record channels, i.e., in proper chronological correspondence. Such a recording is also called a linear time-base event recording.

A further object is to provide a method and apparatus for recording a succession of tests consecutively on the same record medium, each test involving the recordation of a group of concurrently varying data in separate record channels, wherein at least some of the channels are used both for recording data during the actual test and for recording test-identification information during a test-identification period. The test-identification information is preferably recorded according to a serial group identification code.

A further object is to provide an economical method and device for recording and thereby storing electrical pulses from a plurality, e.g., five to eight or more, pulse generators in separate record channels in a durable form which is adapted for automatic interpretation. Ancillary thereto, it is an object to provide a means for collecting such multi-channel data, e.g., at outlying locations, and later feeding the data to central analyzing equipment, such as computers, code tape punching, or plotting equipment, without direct communication links from the data sources to the central equipment, and to permit a multiplicity of such records, made simultaneously over extended periods, to be fed rapidly to such central equipment.

Still other objects relate to the provision of a data-recording system which includes electrical pulse emitters controlled by changes in data, such as measuring and timing devices, a tape punching machine, and electrical circuit elements interconnecting the pulse emitters and the punching machine in such a way that each item of data is recorded in a separate tape channel without mutual interference from pulses emitted from different emitters at slightly different times.

Further objects will appear from the following description of the invention, two preferred forms of which are disclosed in connection with the accompanying drawings forming a part of this specification, wherein:

FIGURE 5 is a circuit diagram of a modified form of pulse-limiting unit; and

FIGURE 6 is a view showing a punched tape prepared by the system using the modified circuit of FIGURE 5.

An important advantage of the system lies in the intermittent advance of the record medium, which is advanced under the control of one or more pulse circuits only when necessary. Two different types of advancing-control are illustrated: In the first, illustrated in FIGURES 1–4, the record medium is, during the actual test period, advanced only once each time that a signal is transmitted through a selected signal channel to make a mark in the corresponding record channel and signals transmitted through other channels during the interval between signals in the selected channel are recorded simultaneously with the succeeding mark in the selected channel. In this arrangement the channel selected should be that in which the recorded signals have the highest repetition rate; thus, when one of the channels is used to record a series of isochronistic pulses and this channel is selected, the time interval of such time signals must be less than the shortest expected interval between signals in the other channels; however, any of the channels may be selected. In the other embodiment, illustrated in FIGURES 5 and 6, the record medium is advanced whenever a signal is transmitted through any or through a selected plurality of signal channels.

Although in the following description a tape-punching machine is specifically described as the preferred embodiment; however, it should be understood that the invention is applicable also to other multi-channel recording media, such as mechanical, optical and magnetic media.

FIRST EMBODIMENT

Figure 1:
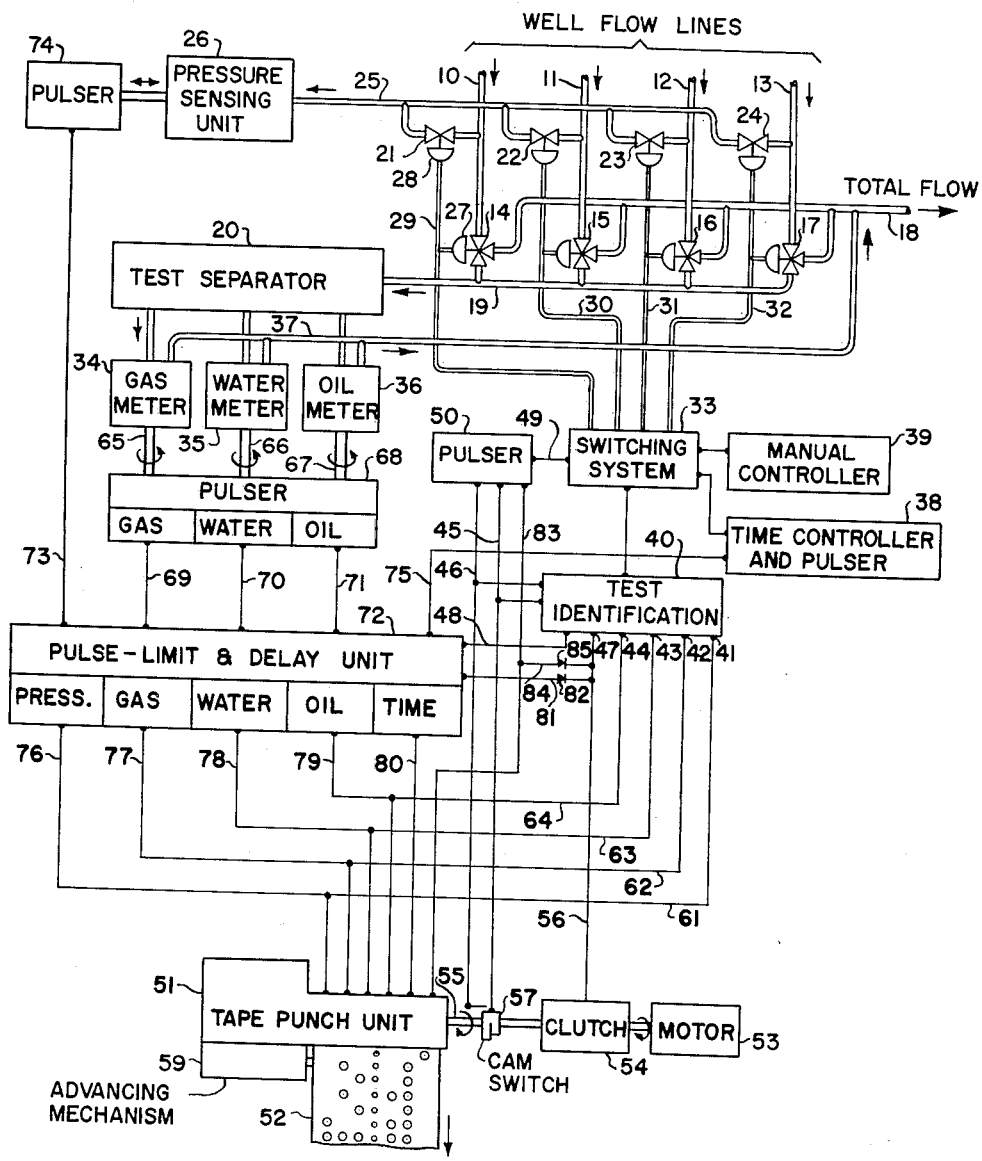
FIGURE 1 is a block diagram of the recording system as applied to an automatic well-logging installation, certain flow lines, valves and auxiliary equipment being indicated diagrammatically.

Referring to FIGURE 1, the system is applied to making tests successively on each of a series of well flow lines 10—13, which are connected via three-way valves 14—17 to a total flow discharge pipe 18. These valves are connected to a test manifold 19 which feeds into a test separator 20. Each of the well flow lines is further connected through a valve 21, 22, 23 or 24 to a pressure test manifold 25 which is connected to a pressure-sensing unit 26. The valves 14—17 normally cause flow of well fluid to the pipe 18 and the valves 21—24 are normally closed. Each of these valves is provided with a valve-operator, such as the operators 27 and 28 for the valves 14 and 21, respectively, which may be pneumatic or electrical. Each pair of valve operators serving the same well flow line is provided with a common control line 29, 30, 31 or 32 leading to a switching system represented by box 33 which energizes one of the control lines at a time to operate the corresponding valves; this connects one well flow line at a time to the pressure-sensing unit and diverts the flow in that well line from the line 18 to the test separator 21.

In the separator the well fluid is separated continuously into a plurality of components as desired, e.g., into gas, water and oil, which flow through connecting pipes into flow meters 34, 35 and 36, respectively. These may be of any suitable type, such as displacement meters having shafts that rotate progressively as the fluid flows through the meters or dump-type meters that have chambers which are alternately filled and emptied with fixed, preset volumes of liquid and wherein the flow is indicated by counting the number of operating cycles. The component streams are discharged into a discharge manifold 37 and conducted to the total flow pipe 18.

The switching system 33, which is known per se in the art, constitutes a control means for selecting the well to be tested and emitting certain signals as described hereinafter under control of a time-controller and pulser 38. The latter emits time signals at proper intervals corresponding to the duration of each well test, e.g., two to ten hours, to the switching system for causing the latter to terminate one test and initiate the succeeding test. Tests may also be initiated and terminated by a manual controller 39.

The switching system operates in conjunction with a test-identification signal emitter, represented by the box 40, which emits multi-channel signals during the test-identification period of any test. In the embodiment disclosed this period is at the beginning of a test, but this choice is not restrictive of the invention. During this period the emitter produces a series of electrical pulses in its several signal output terminals 41—44 which may be in any form, e.g., coded so that each of a pattern of simultaneous pulses from the group of terminals indicates a different item of information, or according to a serial group identification code so that each terminal emits pulses pertaining to one item of information; in the latter alternative, which will be described hereinafter, each terminal receives a number of pulses identifying that item. These pulses are emitted by the emitter 40 at a rate controlled by the recording machine through an electrical circuit 45—46. Simultaneously with these information pulses a punching and tape-advance pulse is emitted at terminal 47. During the test-identification period a continuous electrical signal is also emitted via a circuit 48 for a purpose to be described.

The control means 33 further emits an end-of-test signal via a circuit 49 at the completion of a test and prior to the test-identification period for the next test. This signal is recorded in a separate channel on the tape. It is preferred to record this signal in the form of a series of holes, such as twenty to sixty, both to produce an interval on the tape between the end of one test and the test-identification on the next test, thereby facilitating later tape-handling and operation of the interpreting devices, and to insure recognition of the end of the test. To this end the circuit 49 is connected to a pulse emitter 50 which generates a sequence of electrical pulses at a rate also controlled by the recorder through the circuit 45—46.

The recorder is represented as a multi-channel tape-punching machine 51 (also known as a motorized punch) having one punch (not shown) for each channel on paper tape 52, e.g., six as represented; however, a different number of channels, e.g., eight or more, may be used. Because one channel is allocated to each item of data (or, stated otherwise, to each data source from which pulses are to be recorded), there are at least as many channels as items of data. By recording each item in the allocated channel all pulses recorded in any channel pertain to the identic item. The machine, various types of which suitable for the invention are known in the art, need not be described in detail and the summary description presented herein is fully applicable to only one specific type. The machine includes a continually operating electric motor 53 the output shaft is coupled through a magnetically operated, single-revolution clutch 54 to an operating shaft 55. The clutch normally is disengaged; when an electrical pulse (e.g., of at least 15 milliseconds duration, but less than the cycle time of the shaft) is applied via the circuit 56, e.g., from the terminal 47, the clutch is engaged to rotate the operating shaft through one revolution. The operating shaft carries a normally open cam-switch, which is represented diagrammatically at 57 and connected to the circuit 45—46; it is closed momentarily near the end of the revolution of the shaft. Each punch has a separate activating means, e.g., in the form of a solenoid 58 (FIGURE 2), also known as a code magnet which, when electrically energized for a control period like that described above for the clutch, arms the corresponding punch latch and thereby arms the punch to be depressed by the shaft during the next revolution of the operating shaft. The code magnets may be energized simultaneously with the clutch to cause punching during the same cycle; however, the code magnets may be energized sooner, individually, sequentially or simultaneously with one another, to arm the corresponding punches and cause simultaneous punching strokes thereof during the ensuing revolution of the operating shaft. The machine also includes a tape-advancing mechanism, represented diagrammatically at 59, which advances the tape 52 step-wise following each punching operation, after the punches have been retracted from the tape. It may be operated mechanically or electrically from the shaft 55 by means, not shown.

Each signal-output terminal 41—44 is connected by a separate circuit 61, 62, 63 or 64, to a separate code magnet. As indicated in the drawing, these circuits are connected to the solenoids or code magnets of the four left punches.

Each flow meter may have an output shaft 65, 66 or 67 which revolves continuously at a speed proportional to the measured flow to actuate a pulse emitter represented by the block 68. The latter has three electrical output terminals associated with the respective shafts and each emits a series of electrical pulses at a rate proportional to the rotation of the corresponding shaft. When the meters 34—36 are of the dump type there would, of course, be no such continuously rotating output shafts; instead, the pulse emitter 68 would then be connected mechanically or electrically to the meters to produce a pulse at the completion of each cycle of filling and emptying the meter chamber, so that again each pulse denotes the flow of a fixed volume of liquid. Because dump type meters are known and do not constitute an element of this invention, such a pulse emitter will not be further described herein. In either embodiment, each pulse denotes an additive change in the measured quantity. The output terminals from the pulse emitter are connected by separate electrical circuits 69, 70 and 71, respectively, to a pulse-limit and delay unit represented by the box 72. The unit 72 also receives pressure pulses via a circuit 73 from a pulser 74 (further described hereinafter) and time pulses via a circuit 75 from the time pulser 38. The latter emits isochronistic pulses which may be of relatively short duration, e.g., from one-fiftieth to one or two seconds. In the embodiment being described, wherein the time pulses control the punching clutch, the repetition rate of the time pulses must be greater than the highest rates expected in the pulsers 68 and 74. By way of example, the isochronistic pulses may be emitted every thirty-six seconds, i.e., one-hundredth of an hour.

The pulse-limit and delay unit is described in more detail hereinafter. At this point it is sufficient to note that the pulses from the pulsers 68 and 74 are or may be of relatively long duration, e.g., several seconds up to a minute or more, and that the unit 72 permits only a single pulse of short duration, such as 20 to 100 milliseconds, to be transmitted. A second function of the unit is to delay in certain cases the transmission of a pulse which arrives just after another pulse has been transmitted to the tape-punching machine but before the machine has completed the punching and tape-advance operations; this avoids mutual interference between the pulses. Such interference could result in faulty operation of the tape punch, such as omission of a punch, double punching or tearing of the tape. A third function of the unit is to block the transmission of signals from the pulser 68 during the test-identification period, during which the circuit 48 is energized.

The five data outputs from the unit 72 are transmitted by separate electrical circuits 76—80 to separate code magnets 58. Each such magnet is associated with a punch which operates in a tape channel which is allocated to the item of data transmitted through one of the circuits 76—80. As indicated in the drawing, these circuits are connected to the magnets of the five left punches, four of which are also connected to test-identification circuits 61—64. The unit 72 also has a clutch output circuit 81 which emits a short pulse each time the time circuit 75 is energized; the circuit 81 is connected to the circuit 56 through a diode or rectifying cell 82 to prevent spurious feed-back of pulses from circuit 56 into the circuit 80. The output of the end-of-test pulse emitter 50 is connected by a circuit 83 to the code magnet of the remaining punch, to cause punching and tape advance for each pulse in this circuit it is connected via a circuit 84 and diode 85 to the circuit 56. The diode 85 prevents feed-back to the circuit 83.

It will be understood that FIGURE 1 is largely diagrammatic and that return circuits and sources of electrical potential, which would be provided in practice, were omitted for clarity.

Figure 2:
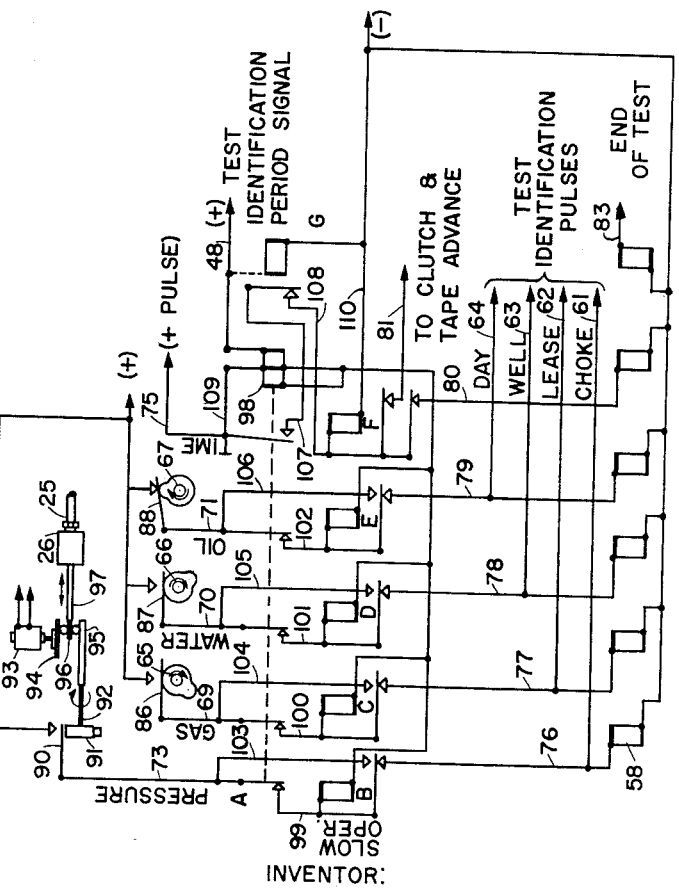
FIGURE 2 is a circuit diagram of the flow- and pressure-pulsers and the pulse-limiting and delay unit.

Referring now to FIGURE 2, which shows the units 68, 72 and 74 in greater detail, each of the meter output shafts 65—67 carries (in the unit 68) a cam for closing a switch 86, 87 or 88 once each revolution. One contact of each switch is connected to a source of positive electrical potential via a common circuit 89 and the other contacts are connected to the circuits 69—71, previously decsribed. Thus each of the latter circuits receives a pulse once each time a unit volume of gas, water or oil has passed through the respective meter. It is evident that the switches 86—88 may be actuated by other devices; for example, in the case of dump-type meters they may be mechanically operated from the valves which control the filling and emptying of the meter chamber.

The pulser 74 includes a switch 90 the contacts of which are connected between the circuits 73 and 89 and which is closed by a cam 91 once each revolution of the output shaft 92 of an integrator unit. The integrator unit is a commercially available device and includes a constant-speed electrical motor 93 which turns a driving disc 94; a driven cylinder 95 on the shaft 92; and a reciprocable cage 96 housing a pair of balls for transmitting motion from the disc to the cylinder. The ball cage is positioned by an axially movable rod 97 which is moved by the pressure-sensing unit 26 to a position determined by the pressure in the pressure test manifold 25. It is evident that the circuit 73 receives a series of electrical pulses proportional to the pressure when the unit 26 is constructed to position the ball cage away from the axis of rotation of the disc 94 by a distance proportional to the pressure.

Considering next the unit 72, each of the circuits 69—71, 73 and 75 is branched; one branch of each circuit is connected to a separate spring contact of a five-pole relay A having a magnet 98 with two windings. The normally-closed, back contacts of the left four poles are connected by circuits 99—102 to the magnet windings of relays B, C, D and E, respectively, and also to the respective spring contacts. The normally closed, back contacts of these relays are connected to the output circuits 76—79, respectively, and the make contacts thereof are connected to the branch circuits 103—106, which by-pass the relay A. The make contact of the fifth pole of relay A is connected by a circuit 107 to the spring contact of a relay G, the normally-closed, back contact of which is connected by a circuit 108 to the magnet winding of a two-pole relay F and to the two spring contacts thereof. One normally-closed, back contact of relay F is connected to the circuit 80 and the other to the circuit 81, both previously described. One winding of the magnet 98 is connected to the branch circuit 109. The other winding of the magnet 98 and the magnet winding of the relay G are connected to the circuit 48. All magnet windings are connected to a return circuit 110, which is also connected to the solenoids 58 of the tape-punch.

The relays B–F, inclusive, may be make-before-break types; they should operate slowly so as to permit a pulse to pass via the back contacts for a time sufficient to activate the punches and, in the case of the relay F, sufficient to activate the punching machine clutch 54 and tape-advancing mechanism. Minimum durations for these operations are usually from 5 to 20 milliseconds, e.g., 15 milliseconds in one commercially available machine. To avoid loss of a pulse which arrives just too late to activate its punch after the cltuch is energized, these relays preferably have operating times in excess of, e.g., twice the minimum times noted. However, these relays must operate fast enough to open the back contacts sufficiently in advance of completion of one revolution of the operating shaft 55 to avoid double punching.

*Operation of first embodiment*

At the start of a series of tests the controller 38 controls the switching system 33 to energize a selected one of the control lines 29—32, e.g., the line 29, activating the valve operators 27 and 28 to open the valve 21 and operate the valve 14, thereby connecting the corresponding well flow line, viz., the line 10, to the manifolds 25 and 19. The pressure-sensing unit 26 thereupon positions the ball cage 96 to effect rotation of the cam 91 at a rate proportional to the pressure prevailing in the line 10, thereby producing in the circuit 73 a series of positive electrical pulses at a corresponding repetition rate. These rates are considered in detail hereinafter. The fluid from the selected well, after being separated into its constituents within the separator 20, flow through the meters 34—36, causing the shafts 65—67 to rotate at rates proportional to the flow rates of the constituents and producing in the circuit 69—71 separate series of positive electrical pulses at repetition rates proportional to the respective rates. The time pulser 38 emits isochronistic pulses through the circuit 75, e.g., one positive pulse of half-second duration every 36 seconds.

Concurrently with the start of the test the switching system activates the test-identification signal emitter 40, which becomes active during an initial test-identification period preceding the actual test. During this period a continuous positive potential is applied to the circuit 48, which operates relays A (through its second winding) and G; the former opens the left four poles and, hence, the circuits to the magnet windings and spring contacts of the relays B, C, D and E, thereby blocking the transmission of pulses from the data pulse emitters 68 and 74; the latter opens the circuit 108 through the back contact and blocks the transmission of time signals. (It may be noted that the blocking relay G is an optional feature; it may be omitted, for example, when the time pulser 38 is controlled to emit only after the test-identification period.) Also during this period the emitter 40 emits a series of identification pulses from the terminals 41—44 through the connecting circuits 61—64 to the left four tape punch code magnets 58.

Figure 4:
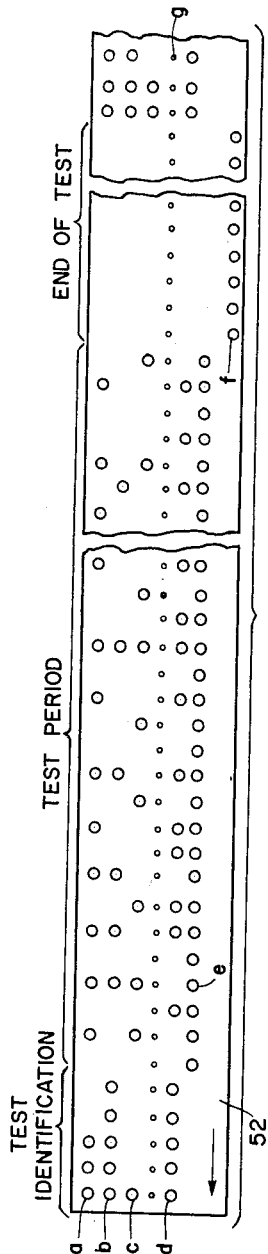
FIGURE 4 is a view showing a typical punched tape prepared by the system shown in FIGURES 1 and 2.

As suggested in FIGURE 2, the test information may pertain to the choke used, the lease number, the well number, and the day of the test. Each circuit 61—64 is energized a number of times representing the test information to be recorded. For example, as illustrated in FIGURE 4, the left channel *a* contains three holes produced by three positive pulses emitted at the terminal 41 and transmitted via circuit 61 to the left code magnet during the identification period, representing a No. 3 choke; the next channel *b* contains five holes, denoting the fifth lease; similarly, the channels *c* and *d* denote the first well and the fifth day of the month. The smaller holes *g* in the center are punched by the machine for facilitating the tape advance. These pulses are produced in a known manner and are of short durations, greater than the operating times of the clutch and code magnets but less than the cycle time, to cause only single punches. Thus, the sequences of pulses can be controlled by stepping switches and the rate of emission of these pulses is then controlled by the tape punching machine as follows: Simultaneously with the emission of any one or more pulses, the terminal 47 receives a short pulse, of duration as described above for the back contacts of relay F, to cause the circuit 56 to energize the clutch 54. The tape is advanced by the mechanism 59 at the end of the cycle. The stepping switches in the emitter 40 do not advance to emit the succeeding pulses until the control circuits 45—46 are connected together by momentary closing of the cam switch 57 just prior to the completion of the rotation of the operating shaft 55. Hence, each pulse or set of pulses is emitted only after completion of a previous punching operation. At the completion of the test-identification period, which may last for one or a few seconds, the emission of pulses ceases and the circuit 48 is deenergized, permitting the relays A and G to return to their normal positions shown in FIGURE 2.

The test record period proper commences immediately following the test-identification period and continues for a time-period determined by the time-controller 38, e.g., two to ten hours. During this period a hole is punched in the channel *e* and the tape is advanced one step each time an isochronistic pulse is transmitted from the time pulser 38 via the circuit 75, e.g., once every 36 seconds. This action is as follows: When such a pulse occurs the winding of magnet 98 is energized through its primary winding, thereby opening the left four poles of relay A and completing a circuit through the make contact of the fifth pole to the circuit 107; the pulse is thence transmitted via the back contact of the relay G, the circuit 108, the spring contact of the relay F, and the back contacts of the latter to apply simultaneous positive impulses to the circuits 80 and 81, whereby the code magnet controlling the fifth punch (channel *e*) and the clutch mechanism are energized. The tape is automatically advanced at the end of the cycle. This pulse is also applied to the magnet winding of the relay F, which opens the back contacts to limit the duration of the pulse. The relays A and F return to normal at the cessation of the pulse from the circuit 75.

Any data pulse transmitted via the circuits 69—71 and 73 while the relay A is operated is blocked until this relay is released. However, because the cams which control the switches 86—88 and 90 rotate slowly, the data pulses persist for at least several seconds, which is much longer than the duration of the time pulses. Hence, data pulses initiated while relay A is operated are transmitted via the spring contacts and back contacts of the relay A immediately following release of this relay. These data pulses are transmitted via the spring contacts and back contacts of the relays B—E and the circuits 76—79 to the respective code magnets and thereby activate the punches, in readiness to punch holes in the channels *a* through *d* of the tape when the next time pulse causes the operating shaft to rotate. The durations of these data pulses are limited by the operation of the relays B—E, which close the make contacts and open the back contacts and are thereby locked in operated positions via the circuits 103—106 so long as the input circuits 73 and 69—71 remain energized. This prevents a pulse of long duration in these circuits from being again transmitted to the code magnets following a punching operation.

At the end of the test the switching system 33 emits a signal through the circuit 49 to activate the pulser 50. This causes a series of pulses to be emitted through the circuits 83 and 84 to the sixth code magnet 58 and the clutch 54, at a rate controlled by the cam switch 57 via the circuit 45—46, in a manner described above for the emitter 40. This causes a series of holes to be punched in the channel *f*, as shown in FIGURE 4. During this period a continuing pulse is preferably applied to circuit 48 to prevent time and data pulses from causing punching.

At the end of this test period the switching system 33 also deenergizes the control selected control line 29 to close the valve 21 and return the valve 14 to normal, and energizes the next control line 30 to connect the next well flow line 11 to the manifolds. This is followed by the commencement of a new test, which is performed and recorded as was described above.

It is evident that the machine-sensitive record, as shown in FIGURE 4, has the isochronistic marks in channel *e* equally spaced, and that the tape contains a record of the flow measurements in orthochronistic form. This is one form of a linear time-base event recording.

Figure 3:
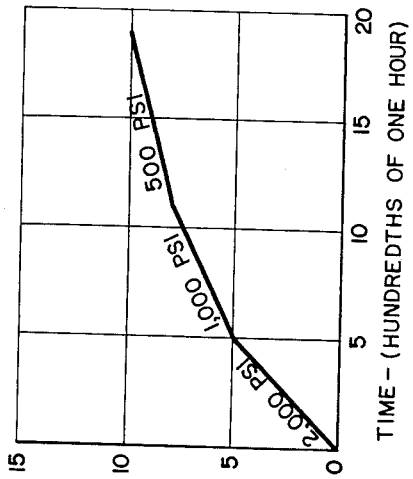
FIGURE 3 is a graph showing the significance of the pressure record.

When, as in this embodiment, the tape-advance is controlled by pulses making marks in a channel other than the pressure channel *a*, the maximum repetition rate of the pressure pulser 74 must not exceed that of the controlling pulses, which in this case are time pulses. Hence this pulser is constructed so that the maximum expected pressure produces a pulse frequency equal to that of the controlling pulses. For example, if the maximum pressure to be recorded is 2000 p.s.i., with time pulses occuring at the rate of 100 per hour, pressure pulses at the rate of 100 per hour represents the maximum pressure. This is indicated in FIGURE 3 by the steepest part of the plotted line. A pressure of 1000 p.s.i. is indicated by 50 pulses per hour, and one of 500 p.s.i. by 25 pulses per hour, as also indicated in FIGURE 3. Other pressures are similarly indicated. By way of illustration, pressure channel *a* in FIGURE 4 contains six holes opposite the first twelve holes in the time channel *e*; hence the pressure pulses occurred at a rate of 50 per hour, corresponding to a pressure of 1,000 p.s.i. After the first six holes, the holes in channel *a* are spaced farther apart, indicating 40 pulses per hour or a pressure of 800 p.s.i.

It is evident that the invention is not limited to the use of pressure pulses at a frequency which is proportional to the pressure, and that an inverse relation may be used. Thus, the highest frequency may correspond to the lowest pressure by an appropriate arrangement of the rod 97 to position the ball cage 96 on the opposite side of the axis of rotation of the disc 94.

Second embodiment

Under certain test conditions, as when particular variables are occasionally subject to rapid changes, it is preferred to make a mark and advance the record medium each time a signal is transmitted. Such an embodiment is illustrated in FIGURES 5 and 6 wherein like parts are designated by like reference numbers. In this embodiment the circuit and parts shown in FIGURE 5 are to replace those of FIGURE 2, the arrangement of FIGURE 1 being unchanged save that additional circuits from cam-operated switches in the tape punching machine to the pulse-limit and delay unit are provided and that the circuit connecting terminal 47 to the circuit 56 and the diode 82 may be omitted. Also, in this embodiment the recorder has an extra channel for identifying test-identification punches.

Corresponding but modified elements are as follows: The five-pole relay is replaced by a six-pole relay A', which is fast-operating to block data transmission after the clutch is energized; and its magnet 98' has only one winding. The relay F' is like the relays B—E. The relay G is omitted and the circuit 48 is connected to the winding of the magnet 98'. Circuit 48 is further connected via a circuit 112 to one contact of a cam switch 57' which is closed momentarily immediately after the start of rotation of the operating shaft 55 of the tape-punching machine; the other terminal of this switch is connected to the circuit 114. In this embodiment the branch circuit 109' of the time circuit 75 is connected to the make contact of the relay F' and the back contact of the fifth pole of relay A' is connected by a circuit 108' to the magnet winding and spring contact of the relay F'. The sixth pole of the relay A' has the make contact connected to the circuits 48 and 112 and the spring contact thereof connected by a circuit 113 to the back contact of the relay H; the spring contact of the latter is connected by a circuit 114 to the one terminal of the magnet winding of the relay H and to the circuit 89. The other terminal of this winding is connected by a circuit 115 to one contact of a cam switch 57" which is closed momentarily near the end of the revolution of the operating shaft as described for the switch 57. The other terminal of this switch is connected by a circuit 116 to the circuit 110.

The circuits 76—79 are connected through separate diodes 117—121 to a common circuit 122, which is connected to the circuit 81; the latter, as is shown in FIGURE 1, is further connected to the clutch.

The tape punching machine has a seventh punch, provided with a code magnet 58*a* and energized via a circuit 123 which is connected to the terminal 47 of the test-identification emitter 40 to receive a positive pulse simultaneously with the emission of any pulse through any of the circuits 61—64. This circuit may be connected to the circuit 122 via a diode 124.

Operation of second embodiment

The operation of the controller and time pulser 38, switching system 33, and pulse emitters 68 and 74 and the test-identification signal emitter 40 are as described for the first embodiment, save that the emitter 40 energizes circuit 123 simultaneously with circuit 61—64, the time pulses are longer, and the purpose of terminal 47 is different. The time pulses should be long enough, e.g., at least half a second, to be transmitted after release of the relay A' in the event that a time pulse is initiated while this relay is operated.

During the test-identification period positive pulses transmitted via the circuits 61—64 activate the corresponding code magnets 58 as previously described; however, the clutch can in this case be activated through the circuits 76—79, the diodes 117—120, and the circuits 122 and 81, obviating the need for a clutch-energizing pulse from the terminal 47. However, terminal 47 energizes code magnet 58*a* to cause punching in the seventh channel *h*. During this period a continuing positive potential in the circuit 48 energizes the magnet winding of relay 98', thereby opening the back contacts of the first five poles and blocking the transmission of data or time signals. Energization of the magnet 98' also closes the make contact of the sixth section to complete a holding circuit through the circuit 114; however, this circuit is interrupted following each punching operation by the action of the relay H, which is operated through the circuit 115 and switch 57". Also, the switch 57' is closed momentarily during the early part of each cycle but plays no role at this time. The pulse in the circuit 48 must be terminated before the completion of the last cycle of the operating shaft during the test-identification period to permit the relay A' to be released by the action of relay H during the last punching operation and before the start of the test recording period.

In the ensuing test period pulses from the pulse emitters 74, 68 and 38 are transmitted to the corresponding code magnets 58 through the back contacts of the relay A', the back contacts of the relays B—E and F' and the circuits 76—80. When a pulse is transmitted to any of these circuits it is also transmitted to the circuit 122 through one of the diodes 117—121 and thence via the circuits 81 and 56 to operate the clutch. This also activates the respective code magnets 58. When the clutch is energized the operating shaft 55 rotates, causing the switch 57' to close early in the cycle; this operates the relay A' and opens the back contacts of the first five poles. Operation of the relay A' also closes the make contact of the sixth pole, thereby locking the relay through the circuit 113, back contact of relay H and circuit 114 until the punching and tape-advancing operations are completed. At the end of these operations the switch 57" is closed momentarily, operating the relay H to open the back contact and release the relay A'. Any pulse in circuits 69—71, 73 or 75 initiated while the relay A' is operated will be delayed and transmitted when the relay is released. The relays B—E and F' in this case thus limit the pulse to prevent repetitive energization of the code magnets 58 from a single pulse as in the first embodiment.

The punched tape shown in FIGURE 6 illustrates another form of a linear time-base recording. It is similar to that described for FIGURE 4 with the difference that the isochronistic punches in channel e are not equally spaced and an additional channel h is provided to identify test-identification period. In this embodiment the repetition rates of some of the data pulses may exceed that of the time pulses. Thus, FIGURE 6 shows that during the first part of the test the pressure pulses in channel a occurred at the rate of 125 per hour and, later, at a rate of 75 per hour.

It should be noted that in the foregoing description a distinction was made, for convenience, between data and time pulses; however, since time is itself a monotonic variable, both of these pulses may be regarded as pulses denoting changes in a variable magnitude. Further, although identically shaped holes were punched in the tape in each of the data channels and the data were represented in time correspondence with one another, the invention does not exclude the use of different, distinguishable marks to denote additional information which, however, is not a feature of the invention.

In both embodiments the electrical signals or pulses were produced contemporaneously with the events denoted thereby and were recorded orthochronistically, i.e., in proper time correspondence. Thus, the punches occurred substantially at the instant that each electrical signal was produced, the only delay being, in the second embodiment, that occasioned by the operation of the relay A' to prevent interference between two signals initiated in close succession and, in the first embodiment, additionally that occasioned by punching only when the time pulses occur.

The completed record medium can be analyzed in a variety of interpreting equipment. Thus, the punched tape can be fed to a motorized tape reader connected to feed the information from the several channels into separate circuits.

The interpreting equipment, which may take a variety of forms, will not be described in detail. However, such equipment must distinguish between the punches giving test-identification information and those representing measured data. This can be effected either automatically or visually by an operator who makes appropriate settings on the analyzer. In the records according to both embodiments the identification information is always contained in the initial punches (following the series of end-of-test punches in channel f from a previous test in the case of a succession of tests). The termination of the identification punches and the start of the test data punches is recognized in different ways in accordance with the nature of the record:

In the case of records such as that of FIGURE 4, produced by the first embodiment, there will be no time punches in channel e during the identification period (because the relay G blocks time pulses) and a time punch will always appear at the start of the test record period proper, either alone as shown or in the same row with other data (because only the time pulses energize the clutch 54). Hence the occurrence of a punch in channel e will mark the start of the test record period.

In the case of records such as that of FIGURE 6 produced by the second embodiment, the time punch in channel e may not always appear in the first row of holes of the test record proper. In this case the holes in channel h denote that the holes in channel a—d denote test-identification data. It is evident that this scheme can also be employed in the first embodiment, by providing an additional channel on the recorder.

I claim as my invention:

1. A data-recording system for making a record of a succession of similar tests each involving the recordation of similar data, including: a plurality of concurrently active data sources, each including means to produce a series of signals to designate changes contemporaneously with said changes; an identification signal emitter having a plurality of separate signal channels for emitting a plurality of signals identifying the test during a test-identification period of each test; a recorder of the type which produces a machine-sensitive record including means for advancing a record medium, a record medium providing a plurality of record channels which are allocated to different data sources and extend parallel to the direction of motion of the record medium, a separate marking device for each of said channels capable of making machine-sensitive marks, and a separate activating means for each of said marking devices; first transmission means operatively connecting each of said data sources to a different one of said activating means to cause the corresponding marking devices to make separate series of marks in the associated channels on said medium under control of said data-producing means, so that all marks within any allocated channel pertain to the same data source; second transmission means operatively connecting each of said separate signal channels of the identification signal emitter to a different one of said activating means including at least some of the activating means connected by said first transmission means for making separate series of test identification marks in the associated channels under control of the identification signal emitter; and means for blocking the transmission of signals through said first transmission means during the said test-identification period.

2. Data-recording system according to claim 1 including as one of said data sources a timer which emits time signals to cause the marking device associated with said one data source to make a series of time marks in the associated channel on said medium.

3. Data-recording system according to claim 1 including emitter means for emitting a signal at the end of a test and end-of-test transmission means operatively connecting said emitter means to a separate one of said activating means to cause the corresponding marking device to make a mark in the associated channel on said medium denoting the end of a test.

4. A data-recording system for making a record of a succession of tests each involving the recordation of a plurality of similar data, including: a plurality of concurrently active data sources; a pulse emitter for each said data source for emitting a series of electrical pulses in accordance with additive changes in said data; a timer including a pulse emitter for emitting a series of isochronistic electrical pulses; a test-identification signal emitter having a plurality of separate electrical output terminals for emitting electrical pulses to said terminals identifying the test during a test-identification period of each test; a tape-punching machine of the type which produces a machine-sensitive record, including a tape having a plurality of channels allocated to different pulse emitters, a tape-advance mechanism for advancing the tape in steps, a punch for each of said channels, and separate activating means for each of said punches; a first plurality of separate electrical circuits respectively connecting each said pulse emitter to a different one of said activating means to cause the corresponding punches to perforate the tape in the corresponding channels and thereby make separate series of holes under control of said pulse emitters, so that all holes within any allocated channel represent pulses from the same pulse emitter; a second plurality of separate electrical circuits respectively connecting each of said output terminals to a different one of said activating means including at least some of said means connected by said first plurality of circuits to cause the corresponding punches to perforate the tape in the associated channels under control of the test-identification signal emitter; means for blocking the transmission of signals through said first plurality of circuits during the said test-identification period; and means for activating the tape-advance mechanism each time an activating means is activated by a test-identification pulse and at least each time an isochronistic pulse is transmitted to the associated activating means.

5. Data-recording system according to claim 4 wherein said first plurality of circuits includes means for delaying the transmission of a pulse to an activating means during the period that another activating means is activated.

6. A data-recording system including: a plurality of concurrently active sources of quantitative data, each including means to produce a series of signals, each signal designating an additive change in the data changes contemporaneously with said change; a recorder of the type which produces a machine-sensitive record including means for advancing a record medium, a record medium providing a plurality of record channels which are allocated to different data sources and extend parallel to the direction of motion of the record medium, a separate marking device for each of said channels capable of making machine-sensitive marks, and a separate activating means for each of said marking devices; an identification signal emitter having a plurality of separate signal channels for emitting a plurality of signals identifying the data sources during an identification period, transmission means for separately connecting said identification signal emitter and each of said data sources to the activating means to cause the corresponding marking devices to make a separate machine-sensitive mark for each signal received from the identification signal emitter and data source in the associated channel on said record medium; one of said channels being associated with a time data source, said time data source producing signals to designate the elapse of predetermined increments of time, said time data source being connected to the activating means of said one channel and to control means for said record advancing means, said control means actuating said record advancing means to advance the record a discrete amount upon the making of each machine-sensitive mark on the record.

References Cited in the file of this patent

UNITED STATES PATENTS

| | | |
|---|---|---|
| 359,210 | Haight | Mar. 8, 1887 |
| 1,315,201 | Bauer | Sept. 9, 1919 |
| 1,451,900 | Diegel | Apr. 17, 1923 |
| 1,800,019 | Hewett | Apr. 7, 1931 |

FOREIGN PATENTS

| | | |
|---|---|---|
| 223,270 | Great Britain | Oct. 8, 1924 |
| 525,074 | Belgium | Dec. 31, 1953 |